May 10, 1938.  W. H. ROSE  2,116,714
DUSTING MATERIAL CARTRIDGE
Filed Jan. 12, 1935  3 Sheets-Sheet 1
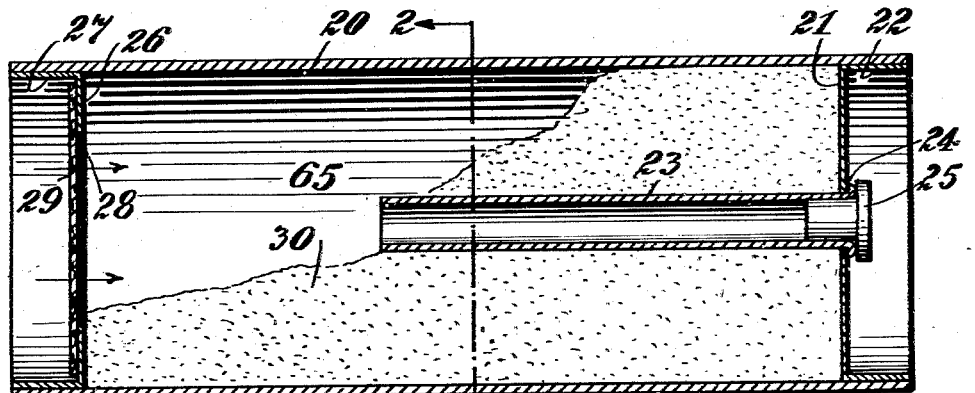
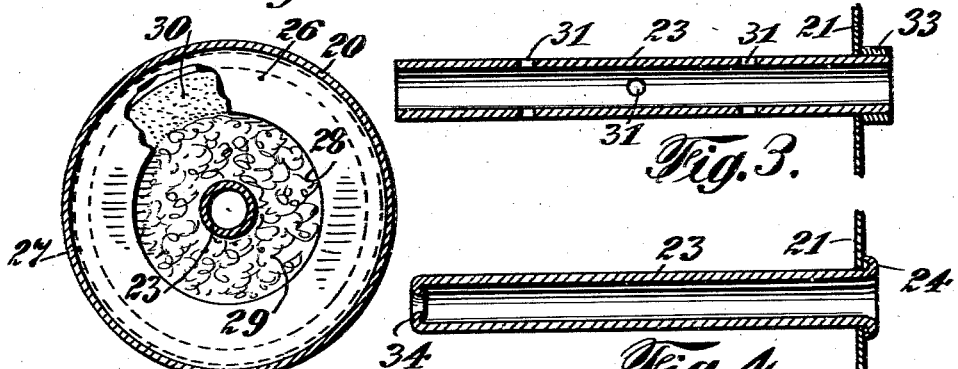
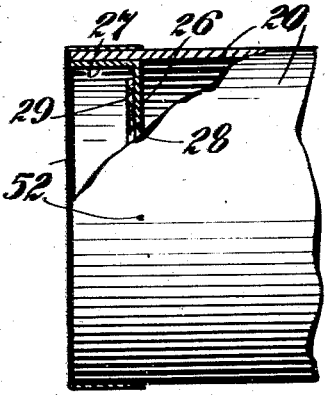
INVENTOR.
William H. Rose
BY
ATTORNEY.

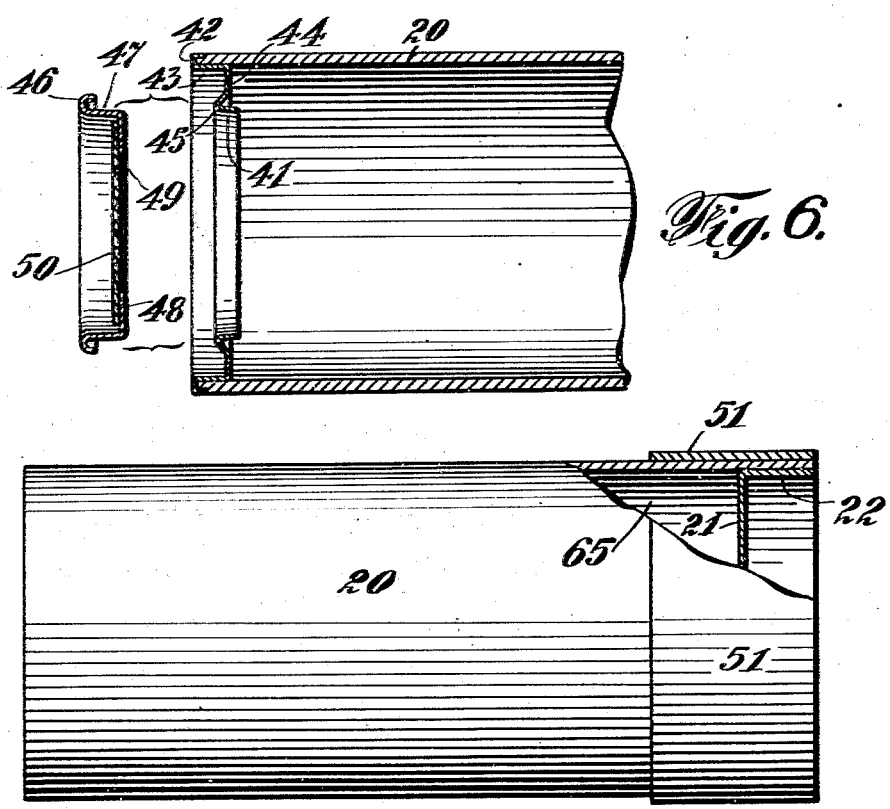

May 10, 1938.  W. H. ROSE  2,116,714
DUSTING MATERIAL CARTRIDGE
Filed Jan. 12, 1935  3 Sheets-Sheet 3
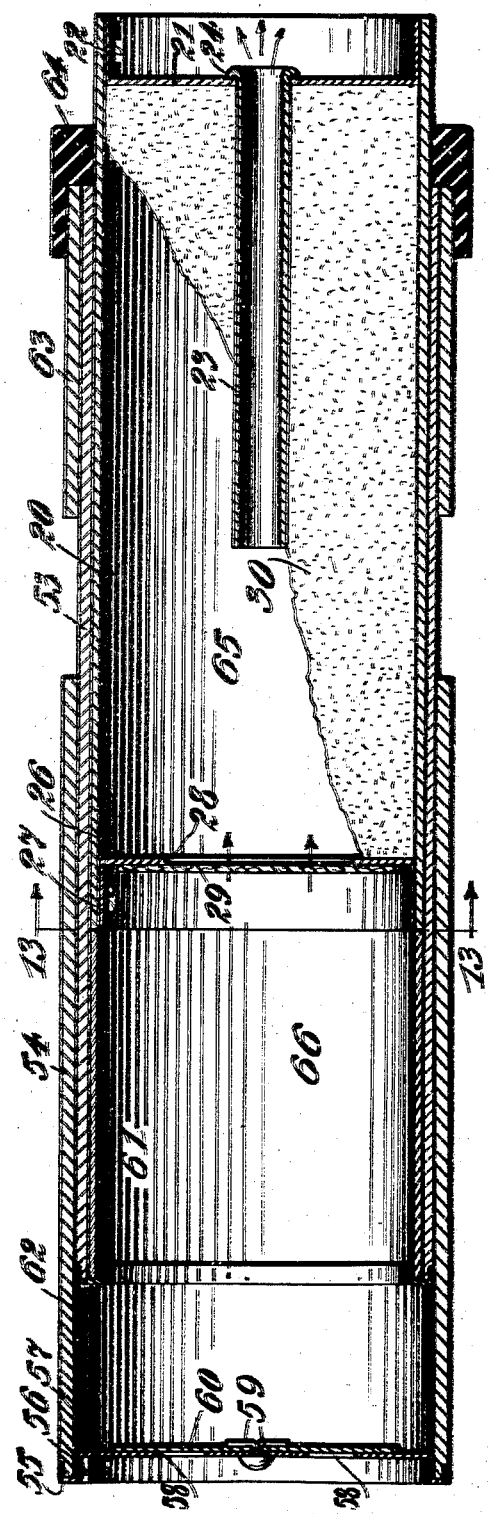
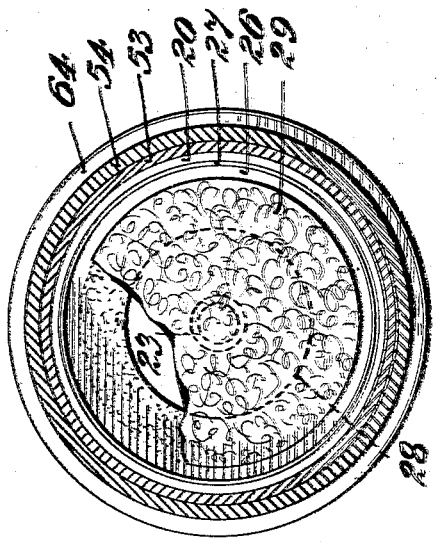
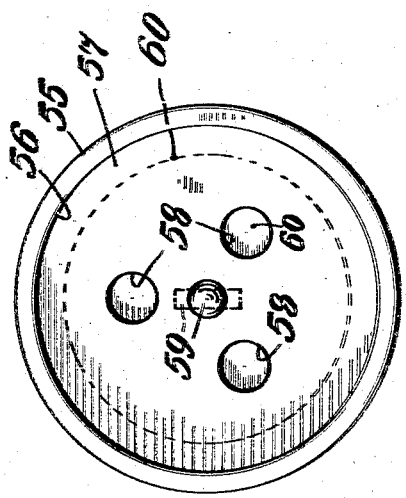
INVENTOR.
William H. Rose
BY
ATTORNEY.

Patented May 10, 1938

2,116,714

UNITED STATES PATENT OFFICE 2,116,714

DUSTING MATERIAL CARTRIDGE

William H. Rose, Jersey City, N. J., assignor to Stanco Incorporated, a corporation of Delaware Application January 12, 1935, Serial No. 1,488

1 Claim. (Cl. 43—147)

My invention relates to dusting-powder containers, and refers particularly to dusting-powder containers in the form of cartridges suitable for insertion into and employment with powder guns.

One of the objects of my invention is a dusting-material container or cartridge capable of being readily inserted within and removed from a powder gun.

Another object of my invention is a refillable or non-refillable dusting-material container for the purposes indicated.

Another object of my invention is a self-contained dusting-material container requiring only a powder gun for its operation.

Another object of my invention is a dusting-material container which does not require perforation in order that it may be employed in a powder gun.

Another object of my invention is a dusting-material container which does not require mechanical penetration in order that it may be employed in a powder gun.

Another object of my invention is a dusting-material container which is dust-proof during handling and shipment.

Another object of my invention is a dusting-material container which can be readily filled by mechanical container fillers.

Another object of my invention is a dusting-material container, one form of which is without moving valve during operation.

Another object of my invention is a dusting-material container the contents of which are not exposed during its insertion into a powder gun.

Another object of my invention is a dusting-material container the operation of which consists simply in its insertion into a powder gun and the operation of the latter.

Another object of my invention is a dusting-material container capable of operation with powder guns of various mechanical constructions.

Another object of my invention is an inexpensive dusting-material container for the purposes described.

The above mentioned and other desirable objects are obtainable by the use of the dusting-material container of my invention as will be evident upon a consideration of my specification and its accompanying drawings.

The chief objectionable feature incident to the use of most of the devices suggested for the spraying of dusting materials is that they are retained in containers having no relation to the powder gun, and hence they must be opened and the fine dusting material poured into the gun, thus resulting in all of the objectionable features of dust-laden air and the possibility of spilling and losing some of the powder.

In using my device, however, a cap is removed and the entire container, or cartridge inserted into any suitable gun without exposure of its contents.

It is to be particularly noted that my cartridge is of the most inexpensive construction, costing but very slightly more than an ordinary carton, and that it can be employed with a gun consisting simply of a cylinder construction with a flap-valve, or other suitable inexpensive valve, and it thus possesses all of the desirable properties of a device of this character at a minimum of cost.

The many advantages of my device are evident from the following description.

In the accompanying drawings illustrating modified forms of the device of my invention, similar parts are designated by similar numerals.

Figure 1 is a vertical cross-section of one form of the device of my invention.

Figure 2 is a section through the line 2—2 of Figure 1.

Figure 3 is a vertical cross-section of a modified form of my delivery tube.

Figure 4 is a vertical cross-section of a modified form of my delivery tube.

Figure 5 is a vertical cross-section of one form of my device showing a closure cap.

Figure 6 is a vertical cross-section of a modified form of the air-entrance end of my device.

Figure 7 is a side view of a modified form showing a stop member attached thereto.

Figure 8 is a vertical cross-section of one form of my device incorporated within a piston member.

Figure 9 is a left-end view of the device of Figure 8.

Figure 10 is a section through the line 13—13 of Figure 8.

The particular form of the device shown in Figures 1 and 2 consists of a hollow cylindrical cardboard member 20, one end of which carries a closure consisting of an annular member 21 having the outwardly extended flange 22 which is fixedly maintained in position by the frictional contact between the flange 22 and the inner face of the cylinder 20, or it may be fixedly attached thereto by glue or otherwise.

Through an opening in the annular member 21 there is an inwardly extended tube 23, the outer edge of which is extended outwardly to form the flange 24, the tube 23 and the flange 24 being fixedly attached, or glued, to the annular member 21.

A removable plug, or closure, 25 closes the tube 23 when inserted therein.

The other end of the cylindrical member 20 carries a closure consisting of an annular member 26 having the outwardly extended flange 27 fixedly attached to the inner face of the member 20. An opening 28 of the member 26 is covered by a disk 29 of porous material, which may be of textile or other material which is of such character and construction that it will allow of the passage of air therethrough but will prevent the passage therethrough of the dusting material 30 contained within the cartridge.

The disk 29 is fixedly attached to the element 26 by means of glue or otherwise.

In the modified form of the tubular member 23 shown in Figure 3, the tubular member has a plurality of openings 31—31, and the outer end is straight, the tube 23 being maintained in position by means of a binding ring 33 which is fixedly attached to the closure member 21 and the tubular member 23.

In the modified form of the tubular member 23 shown in Figure 4, the tubular member has its inner end 34 turned inwardly, thus restricting the diameter of the tubular member at this end.

The modification of the closure of the cylindrical member 20, shown in Figure 6, consists of an annular metallic member having an opening 41 therein. This metallic member consists of an exterior U-shaped element 42, extending inwardly at 43, then outwardly at 44 at right angles and then into the V-shaped member 45. The side of the cylindrical member 20 fits into the U-shaped element 42 to form a fixed engagement, the outer face of the U-shaped element 42 being preferably flush with the outer face of the cylindrical member 20. A removable closure for the opening 41 consists of an annular metallic member composed of the U-shaped element 46, the side 47 and the right angularly inclined member 48. The opening 49 of the element 48 is covered with a porous disk 50 as previously described. This particular construction is intended for a refillable cartridge, for which purpose the removable closure is removed, the material is inserted into the cartridge through the opening 41, and the removable closure inserted, thus forming a tight closure for the device.

The modified form of my device as illustrated in Figure 7 is shown in order to indicate a ring member 51 fixedly attached to the cylindrical member 20 which acts as a stop to limit the inward movement of the cartridge into a powder-gun as explained later.

A cover 52 can be placed over the air entrance end of the device if desired, as shown in Figure 5.

The operation of one form of my cartridge is shown in Figures 8, 9, and 10, but I do not limit myself to the particular form of air-pressure member, powder-gun or piston, shown therein which consists of a hollow tubular member 53, over one end portion of which is a telescopically movable cylinder 54, the outward end of which carries a closure consisting of an annular metallic member having the U-shaped element 55, the element 56 and the annular disc member 57 having a plurality of openings 58—58 therein. Fixedly attached to the disc 57, by means of the rivet 59, and covering the openings 58—58 is a flap-valve 60 of suitable flexible material, which will close the openings 58—58 when air pressure is brought to bear upon its inner face, and which will allow of the opening of the openings 58—58 when air pressure is brought to bear upon the outer face of the disc 57. A stop 61 is fixedly attached to the inner face of the member 53, a U-shaped metallic ring 62 encompassing the extremities of the members 53 and 61. A cylindrical grip member 63 is fixedly attached to the outer face of the member 53 and a resilient holding member 64 is fixedly attached to the grip 63.

In operation the closure 25 (Figure 1) is removed and the cartridge inserted within the member 53 until it abuts upon stop 61, the resilient member 64 maintaining it in this position. The member 63 is then grasped by one hand and the member 54 is given an inward and outward telescopic movement by means of the other hand. Assuming the device to be in the position shown in Figure 8, the inward movement of the member 54 causes the air in the chamber to close the flap valve 60 thus forcing the air through the air-pervious member 29 into the chamber 65 of the cartridge causing the dusting material 30 to escape through the tubular member 23 and outward of the device in the form of a spray or mist. The outward movement of the member 54 opens the flap-valve 60, allowing air to enter the chamber 66 for the next operation, and as the member 29 is impervious to the dusting material it will not enter the chamber 66.

When the contents of the cartridge have been expelled, the empty cartridge can be readily removed and a new one inserted, if desired.

From the foregoing description it is evident that my invention presents an effective dusting-material container, without moving parts and having the many desirable and valuable attributes mentioned.

I do not limit myself to the particular size, shape, number, arrangement or material parts particularly shown and described as these are given simply as a means for clearly describing the device of my invention.

What I claim is:

In a dusting-material cartridge, in combination, a casing; a closure for one end portion of said casing having an opening therein; a tubular member extending interiorally from said opening; a closure for the other end portion of said casing having an opening therein; and a felt air-pervious member covering said last mentioned opening, said air-pervious member being non-pervious to the material within said cartridge during its employment in a powder gun.

WILLIAM H. ROSE.